April 19, 1966　　　K. GEISSBAUER　　　3,247,023
LEAD-ACID STORAGE BATTERY PLATE
Filed July 27, 1962　　　2 Sheets-Sheet 1
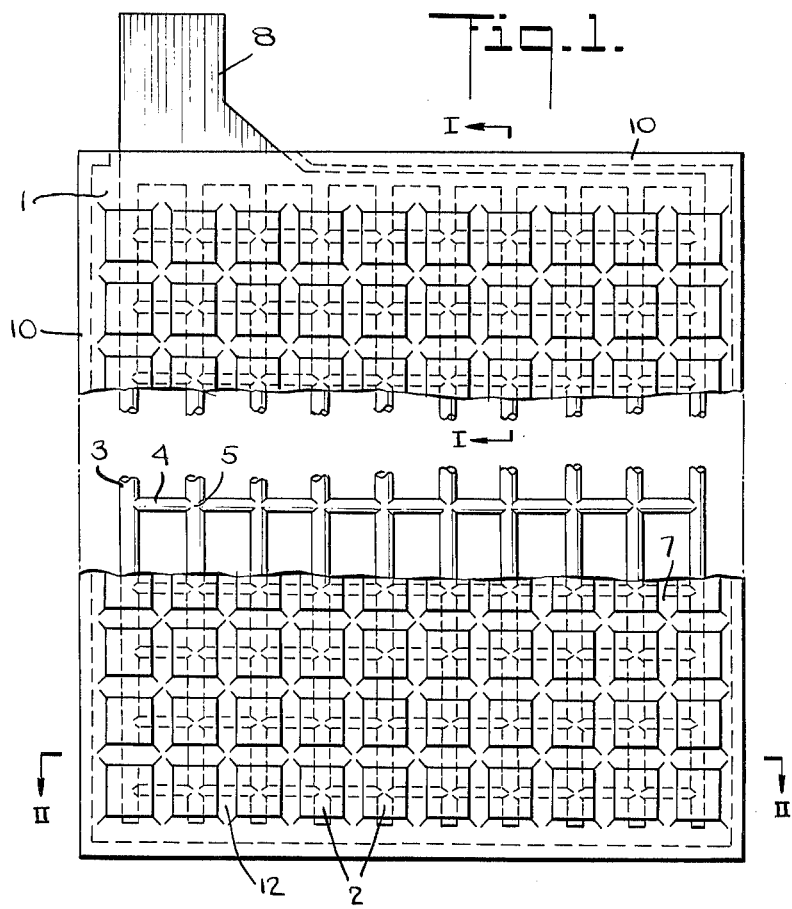
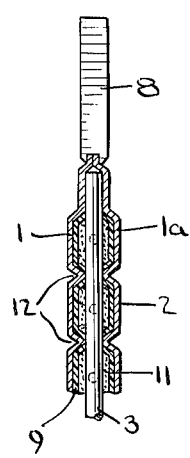
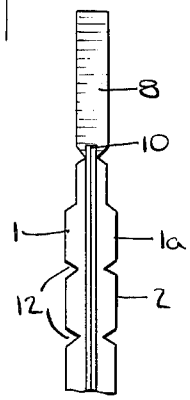
INVENTOR.
KARL GEISSBAUER
BY
Erich M. H. Radok
AGENT April 19, 1966  K. GEISSBAUER  3,247,023
LEAD-ACID STORAGE BATTERY PLATE
Filed July 27, 1962  2 Sheets-Sheet 2

INVENTOR.
KARL GEISSBAUER
BY Erich M. H. Radok
AGENT 3,247,023
LEAD-ACID STORAGE BATTERY PLATE
Karl Geissbauer, Paul-Lagarde-Str. 20/II,
Munich, Germany
Filed July 27, 1962, Ser. No. 212,953
Claims priority, application Germany, July 29, 1961,
D 36,697
2 Claims. (Cl. 136—40)

The present invention relates to improvements in positive electrode plates for lead-acid storage batteries.

It has been proposed to provide such lead-acid storage battery plates with a multitude of small pockets carrying the active material paste thus to enable the electrolyte to penetrate the active material from all sides and to provide a plate of equal capacity to the conventional pasted plates and plates with tubes containing the active material but, in addition, a plate which imparts to the battery improved starting ability, i.e. which is capable of producing high current impulses in a short time. The plates provide a considerably increased active material surface for penetration by the electrolyte for the same amount of active material. In these improved plates, the active material carrying pockets are small, microporous, electrolyte-permeable synthetic resin tubes the axes of which extend perpendicularly to the surface of the carrier grid, the pockets forming a honeycomb structure on the grid surfaces. If desired, the tubes may not only be of hexagonal cross section but may also be rectangular or arcuate. They are fixed on the diagonally extending bars of the lattice grid in any desired manner. The current conductor is either the grid or special lead rods extending into the active material carrying pockets and soldered to the grid frame and/or bars. The active material carrying pockets are preferably centered over the points of intersection between the diagonally extending grid bars and lead projections extend from these points of intersection or from the lead rods extending into the active mass to increase the contact area between the current conductor and the active material.

While these improved storage battery plates are very effective, particularly in starting batteries, their manufacture is very complicated and, therefore, quite expensive. A serious disadvantage is also that the grid frame and bar portions which are freely accessible to the acid electrolyte corrode rapidly so that the operating life of such plates is reduced. Also, conventional negative plates used as counterelectrodes to these improved positive plates have a relatively small active material surface, which correspondingly limits the capacity of the positive plate.

In an effort to overcome these and other disadvantages, it is the primary object of the present invention to increase the effective surface of lead-acid storage battery plates by sub-dividing the active material into a multitude of small masses which can be reached by the electrolyte from all sides but without unduly increasing the manufacturing costs.

This and other objects are accomplished in accordance with this invention with a lead-acid storage battery plate which comprises a lattice grid of lead or lead alloy, such as a lead-antimony alloy, consisting of a plurality of intersecting horizontal and vertical bars, and two like half shells arranged on the respective surfaces of the grid and covering all grid bars so that only the grid lug extends outside the half shells. The shells are joined together along their edges so that they fully enclose the bars of grid. They are of an electrolyte-resistant and non-oxidizing material and shaped to form pockets about the grid, said material being permeable to the electrolyte at least at the pockets. An active material, such as the conventional lead oxide used in lead-acid batteries, fills the pockets in the shells.

In contrast to the conventional plates with tubes holding the active material, the shells do not have an even surface and no parallel pencils are used as current conductors but a conventional lead or lead alloy grid is employed, for this purpose.

In one preferred embodiment, the vertical grid bars are of larger diameter than the horizontal grid bars to facilitate the current flow to the grid lug which is, as usual, mounted on top of the plate.

The half shells preferably are shaped by molding and stamping into a suitable mold providing the largest possible surface area. This may advantageously be accomplished by imparting to the pockets a rectangular or honeycombed configuration.

The half shells may be sintered thermoplastic resin powder sheets which are microporous. Useful resins have been found to be polyvinyl chloride and polystyrene. The manufacture of microporous synthetic resin sheets is, of course, well known and is, therefore, not described herein. Any material may be used, of course, including synthetic resin and glass fiber webs, as long as it is non-oxidizing and electrolyte-resistant.

In a preferred embodiment, the half shells are lined with a non-oxidizing, electrolyte-resistant but electrolyte-permeable, resilient material, such as glass wool. This lining extends between the active material in the pockets and the electrolyte. Its elasticity permits the active material to change its volume without unduly increasing the pressure in the pockets or losing contact with the current conducting grid bars.

Since all parts of the grid, except the lug, lie within the electrolyte-resistant half shells, they are protected from free contact with the electrolyte wherein the plates are immersed. The shells are so shaped that the shell portions separating the active material containing pockets are in contact with those portions of the grid which are not in contact with the active material whereby an excellent current flow is assured throughout the operation of the plate. If desired and found necessary for improvement of the operating life of the plate, these shell portions may be made electrolyte impermeable to prevent access of the electrolyte to the grid portions which are not covered by the active material. This may be accomplished, for instance, by subjecting these shell portions to additional pressure and/or elevated temperature designed to fuse the powder particles or fibers of the shell into impermeable strips.

The above and other objects, advantages and features of the present invention will be more fully understood when considered in connection with the following detailed description of certain preferred embodiments thereof, taken in conjunction with the accompanying drawings wherein FIG. 1 is a side elevational view of a lead-acid storage battery plate according to the invention, with the half shells partly broken away to expose the grid;

FIG. 2 is a section along line I—I of FIG. 1;

FIG. 7 is an end view of FIG. 1.

Figure 3:
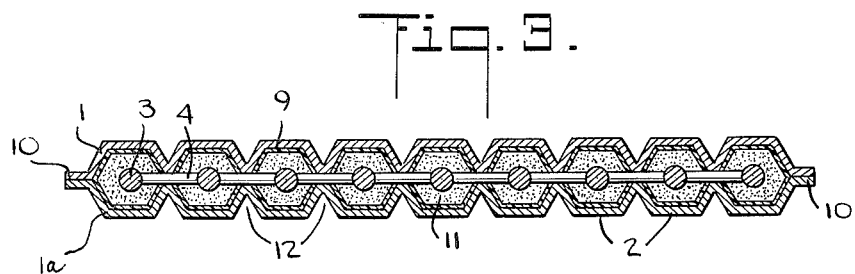
FIG. 3 is a section along line II—II of FIG. 1.

As shown in the drawings, the plate comprises a lattice grid consisting of vertical bars 3 which have a larger diameter than the horizontal bars 4. The grid bars intersect at points 5. Two half shells 1 and 1a are arranged on the respective surfaces of the grid and cover all grid bars. The half shells are alike and are joined to each other along all four edges 10 whereby they fully enclose the bars of the grid, with only the lug 8 extending therefrom. Each shell is shaped to form a multitude of pockets 2 holding the active material 11. As will be noted most clearly from FIG. 1, the points of intersection 5 of the grid bars are centered within the shell pockets 2 so that the active material covers these points and the adjoining portions of the grid bars. The central portions of the grid bars between the points of intersection are in contact with the depressed strip portions 12 of the shells, the shell strips separating the pockets 2 from each other.

In the illustrated embodiment, the pockets are rectangular but they may obviously also form a honeycombed structure if such configuration is desired. Also, if desired, the depressed strips 12 may be subjected to increased temperature and/or pressure during molding and stamping of the sheet so as to become impermeable and better to protect the free grid bar portions from electrolyte.

As can best be seen from FIGS. 2 and 3, an elastic lining 9, such as a glass wool sheet, is arranged between the active material and the shells. When the active material expands during the battery operation, this lining will yield so as to avoid an undue pressure rise and possible bursting of the shells. When it shrinks, the elastic lining will expand and thus press the active material into contact with the grid bars so as to avoid loss of electric current flow to the grid.

The shell edges 10 may be joined in any suitable manner, such as by pressing or fusing the two shells together. If preferred, they may, of course, be bonded by a suitable adhesive agent.

Figure 4:
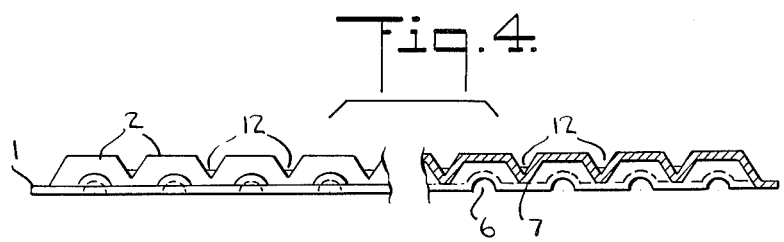
FIGS. 4 to 6 show end views (on left side) and sections (on the right side) of one half shell, the grid, and the other half shell, respectively, of the plate.
Figure 5:
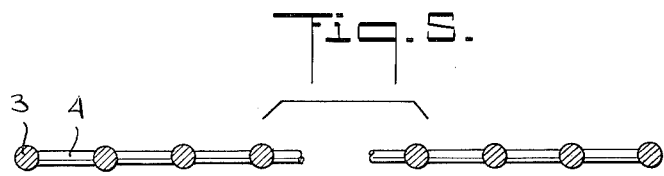
Figure 6:
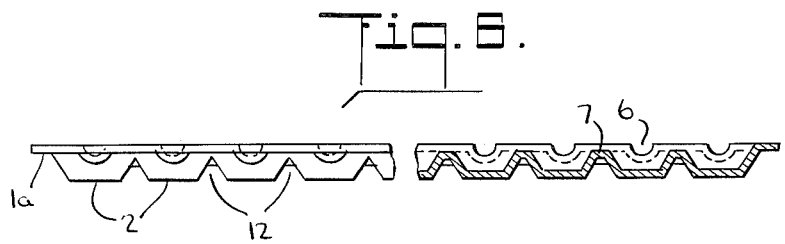

FIGS. 4 to 6 constitute an exploded view of the plate to show the recesses 6 and 7 in the shells, which are provided to fit over the grid bar portions which are not covered by the active material when the three parts of the plate are assembled.

Since the microporous half shells may replace the glass wool separator and a part of the synthetic resin separator conventionally used between the plates of lead-acid batteries, the plate spacing may be correspondingly reduced. Thus, more plates may be used in the same space to increase the capacity of the battery without increase in size or, for a given capacity, a smaller battery may be used. For instance, the half shells may have a wall thickness of about 0.9 to 1.2 mm. and the microporous separator for the negative plates, which is the only separator needed with the positive plates of this invention, may have a maximum thickness of about 1.0 mm.

In this manner, an economical and most efficient battery plate is obtained, which is neither a conventional pasted plate nor a conventional plate with tubular active material containers. Rather, it combines the grid of a conventional pasted plate with large surface shells holding the active material to arrive at a novel plate structure. Such plates are particularly efficient in delivering high voltages instantaneously and have a long operating life. Furthermore, since the shells constitute an insulating barrier, the requirement for separators is so reduced as to make batteries with such plates very economical in space. Without the need for additional electrolyte, an additional plate may be built into the same battery or the battery size may be reduced to obtain the same capacity.

I claim:
1. An electrode plate for a lead-acid storage battery, comprising:
   a lattice grid having a plurality of intersecting horizontal and vertical bars;
   two like half shells arranged on opposite surfaces of the grid and covering substantially all of said bars, said shells being shaped to form separate pockets, said shells forming one pocket about each intersection of said bars and contacting said bars between said intersections, and said shells being permeable to the battery electrolyte at said pockets and impermeable where they contact said bars;
   an active material contained within each said pocket; and
   a layer of resilient material in each said pocket between said half shells and said active material, said resilient material having sufficient resiliency to permit swelling of said active material during battery operation without substantial deformation of said half shells.

2. The plate of claim 1 characterized in that said vertical bars are substantially thicker than said horizontal bars.

References Cited by the Examiner

UNITED STATES PATENTS

| | | | |
|---|---|---|---|
| 2,374,540 | 4/1945 | Hall | 136—148 |
| 2,428,470 | 10/1947 | Powers | 136—59.1 |
| 2,515,204 | 7/1950 | Evans | 136—36 |
| 3,083,250 | 3/1963 | Geissbauer | 136—59 |

FOREIGN PATENTS

| | | |
|---|---|---|
| 63,881 | 1892 | Germany. |
| 829,725 | 3/1960 | Great Britain. |

JOHN H. MACK, *Primary Examiner.*